ID:US009015351B1

United States Patent
Geddes et al.

(10) Patent No.: US 9,015,351 B1
(45) Date of Patent: Apr. 21, 2015

(54) ADDRESS TRANSLATION FOR SR-IOV VIRTUAL FUNCTION APERTURES

(71) Applicant: Marvell International Ltd., Hamilton (BM)

(72) Inventors: David Geddes, Fremont, CA (US); Scott Furey, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 218 days.

(21) Appl. No.: 13/771,702

(22) Filed: Feb. 20, 2013

Related U.S. Application Data

(60) Provisional application No. 61/605,889, filed on Mar. 2, 2012.

(51) Int. Cl.
  *G06F 13/10* (2006.01)
  *G06F 12/10* (2006.01)
  *G06F 9/50* (2006.01)

(52) U.S. Cl.
  CPC .................................. *G06F 12/109* (2013.01)

(58) Field of Classification Search
  None
  See application file for complete search history.

(56) References Cited

U.S. PATENT DOCUMENTS

| | | | | |
|---|---|---|---|---|
| 5,390,308 A | * | 2/1995 | Ware et al. | 711/5 |
| 2004/0260907 A1 | * | 12/2004 | Ozaki | 711/209 |
| 2006/0010262 A1 | * | 1/2006 | Fronte et al. | 710/22 |
| 2008/0168461 A1 | * | 7/2008 | Arndt et al. | 718/104 |
| 2008/0288661 A1 | * | 11/2008 | Galles | 710/3 |

\* cited by examiner

*Primary Examiner* — Ilwoo Park

(57) ABSTRACT

Apparatus having corresponding methods and computer-readable media comprise: an interface to receive a first address in a first address space for one of a plurality of resources, wherein each resource is associated with a respective first aperture in the first address space, and a respective second aperture in a second address space; and a translation module to translate the first address to a second address in the second address space; wherein the translation module includes address translation logic to swap a first sequence of bits in the first address with a second sequence of the bits in the first address; wherein a number of the bits in the second sequence is determined according to a number of the resources; and wherein a number of the bits in the first sequence is determined according to a difference between a size of the first aperture and a size of the second aperture.

20 Claims, 6 Drawing Sheets

ADDRESS TRANSLATION FOR SR-IOV VIRTUAL FUNCTION APERTURES

CROSS-REFERENCE TO RELATED APPLICATIONS

This disclosure claims the benefit of U.S. Provisional Patent Application Ser. No. 61/605,889, filed on Mar. 2, 2012, entitled "METHOD AND APPARATUS FOR REALIGNING SYSTEM DEPENDENT SR-IOV VIRTUAL FUNCTION APERTURES TO FIXED SIZE AND LOCATION," the disclosure thereof incorporated by reference herein in its entirety.

FIELD

The present disclosure relates generally to the field of computing. More particularly, the present disclosure relates to virtualization of computing resources.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In computing, virtualization techniques are used to allow multiple operating systems to simultaneously share processor resources. One such virtualization technique is Single Root I/O Virtualization (SR-IOV), which is described in the PCI-SIG Single Root I/O Virtualization and Sharing Specifications, the disclosures thereof incorporated by reference herein in their entirety. According to SR-IOV, a Peripheral Component Interconnect Express (PCIe) device can appear to be multiple separate physical PCIe devices. For example, a SR-IOV network interface card (NIC) having a single port can have up to 256 virtual functions, with each virtual function representing a respective NIC port.

SR-IOV employs multiple address spaces. That is, the host employs a PCIe address space, while the device employs a device address space. Communication between the host and the device is accomplished using different address apertures for each virtual function. The location and size of the apertures is determined by the host at run time. Within the device, the resources that map to the virtual functions are located at predefined locations in the device address space. The host apertures, having variable location and size, must be mapped to the fixed internal locations of the resources in the device.

One conventional mapping approach employs address translation windows. According to this approach, at least one address translation window is employed for each virtual function. Systems supporting a large number of virtual functions require a large number of address translation windows. Some systems require two or more address translation windows for each virtual function, depending on the number and type of resources to be mapped to each virtual function. In such conventional approaches, the required number of address translation windows can be prohibitively large.

SUMMARY

In general, in one aspect, an embodiment features an apparatus comprising: an interface configured to receive a first address for one of a plurality of resources, wherein the first address refers to a first address space, and wherein each of the resources is associated with i) a respective first aperture in the first address space, and ii) a respective second aperture in a second address space; and a virtual function address translation module configured to translate the first address to a second address, wherein the second address refers to the second address space; wherein the virtual function address translation module includes address translation logic configured to swap a first sequence of bits in the first address with a second sequence of the bits in the first address; wherein a number of the bits in the second sequence is determined according to a number of the resources; and wherein a number of the bits in the first sequence is determined according to a difference between a size of the first aperture and a size of the second aperture.

Embodiments of the apparatus can include one or more of the following features. In some embodiments, each of the resources comprises a respective virtual function hardware module; and each of the virtual function hardware modules is associated with a respective virtual machine. In some embodiments, the apparatus can be configured to use j virtual function hardware modules; an upper bound to the number of address bits in the second sequence is p, wherein $2p \geq j > 2p-1$; the size of the first aperture is $2n$; the size of the second aperture is $2m$; the first sequence includes bits m through n−1 of the first address; and the second sequence includes bits n through n+p−1 of the first address. Some embodiments comprise an address translation configuration module; wherein the interface is further configured to receive a plurality of address configuration parameters; and wherein the address translation configuration module is configured to determine values for m, n, and p based on the address configuration parameters. Some embodiments comprise a resource interface configured to connect the virtual function hardware modules with a physical resource. In some embodiments, the physical resource comprises at least one of: a plurality of storage devices; and a plurality of network interface controllers. Some embodiments comprise a physical function hardware module configured to perform a physical function; and a physical function address translation module configured to translate addresses received by the interface for the physical function. Some embodiments comprise an integrated circuit comprising the apparatus. Some embodiments comprise the integrated circuit; and a host configured to provide the first address to the integrated circuit. In some embodiments, the host comprises: a plurality of processors, wherein each processor is configured to execute a respective virtual machine, wherein each virtual machine is associated with a respective one of the virtual function hardware modules, and wherein the interface is a first interface; and a second interface configured to provide the first address to the integrated circuit. In some embodiments, one of the processors is further configured to implement a virtual machine manager, wherein the virtual machine manager configures the virtual machines. In some embodiments, the interface comprises a Peripheral Component Interconnect Express (PCIe) interface; and the first address space is a PCIe address space.

In general, in one aspect, an embodiment features a method comprising: receiving a first address for one of a plurality of resources, wherein the first address refers to a first address space, and wherein each of the resources is associated with i) a respective first aperture in the first address space, and ii) a respective second aperture in a second address space; and translating the first address to a second address, wherein the second address refers to the second address space, and wherein the translating includes swapping a first sequence of bits in the first address with a second sequence of the bits in the first address; wherein a number of the bits in the second sequence is determined according to a number of the resources; and wherein a number of the bits in the first sequence is determined according to a difference between a size of the first aperture and a size of the second aperture.

Embodiments of the method can include one or more of the following features. In some embodiments, each of the resources comprises a respective virtual function; a number of the virtual functions is j; an upper bound to the number of address bits in the second sequence is p, wherein $2p \geq j > 2p-1$; the size of the first aperture is 2n; the size of the second aperture is 2m; the first sequence includes bits m through n−1 of the first address; and the second sequence includes bits n through n+p−1 of the first address. Some embodiments comprise receiving a plurality of address configuration parameters; and determining values for m, n, and p based on the address configuration parameters. In some embodiments, the virtual functions represent a physical resource.

In general, in one aspect, an embodiment features computer-readable media embodying instructions executable by a computer to perform functions comprising: receiving a first address for one of a plurality of resources, wherein the first address refers to a first address space, and wherein each of the resources is associated with i) a respective first aperture in the first address space, and ii) a respective second aperture in a second address space; and translating the first address to a second address, wherein the second address refers to the second address space, and wherein the translating includes swapping a first sequence of bits in the first address with a second sequence of the bits in the first address; wherein a number of the bits in the second sequence is determined according to a number of the resources; and wherein a number of the bits in the first sequence is determined according to a difference between a size of the first aperture and a size of the second aperture.

Embodiments of the computer-readable media can include one or more of the following features. In some embodiments, each of the resources comprises a respective virtual function; a number of the virtual functions is j; an upper bound to the number of address bits in the second sequence is p, wherein $2p \geq j > 2p-1$; the size of the first aperture is 2n; the size of the second aperture is 2m; the first sequence includes bits m through n−1 of the first address; and the second sequence includes bits n through n+p−1 of the first address. Some embodiments comprise receiving a plurality of address configuration parameters; and determining values for m, n, and p based on the address configuration parameters. In some embodiments, the virtual functions represent a physical resource.

The details of one or more implementations are set forth in the accompanying drawings and the description below. Other features will be apparent from the description and drawings, and from the claims.

Figure 1:
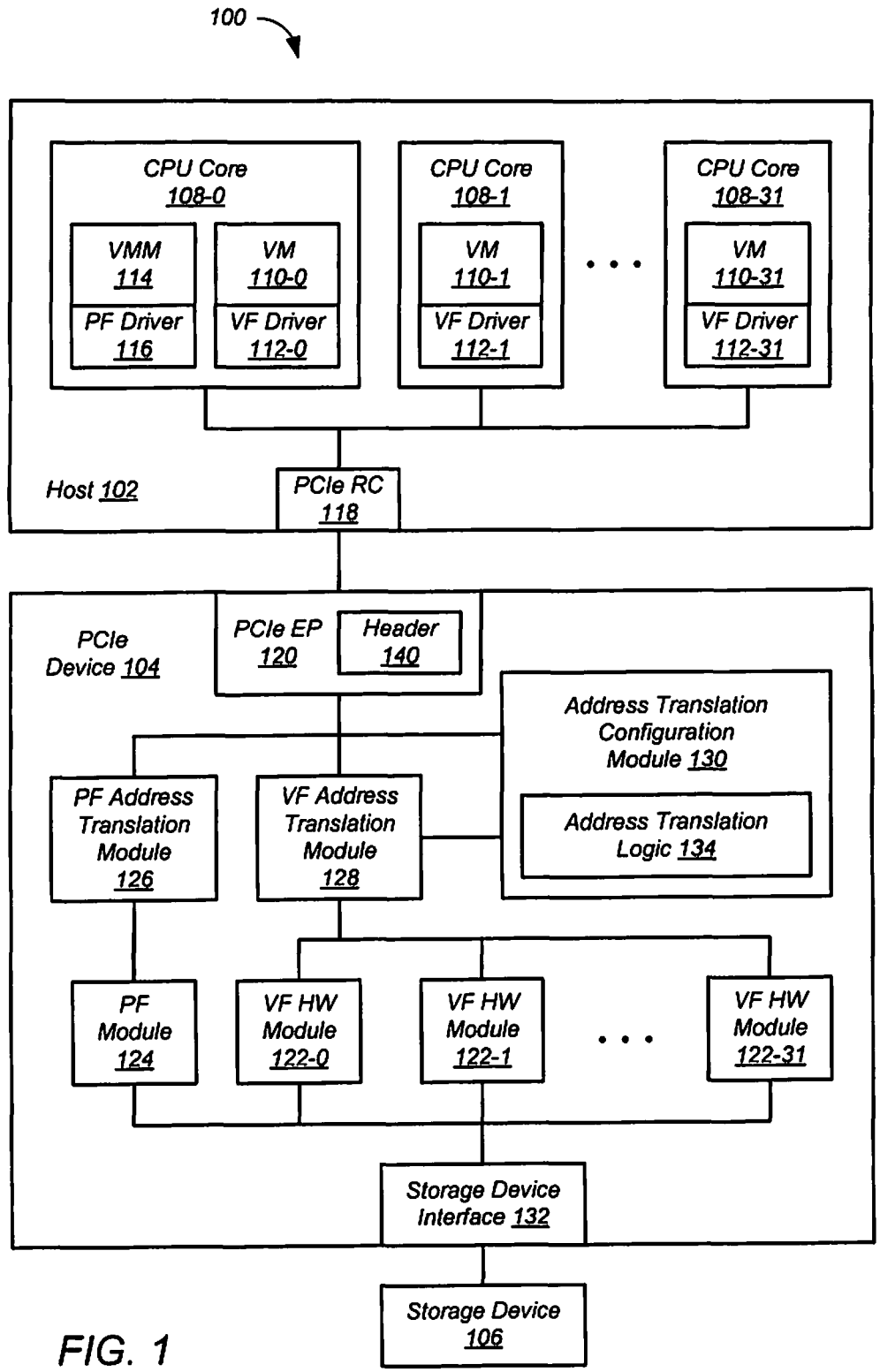
FIG. 1 shows elements of a computing system according to an embodiment that employs SR-IOV for storage devices.

The leading digit(s) of each reference numeral used in this specification indicates the number of the drawing in which the reference numeral first appears.

DETAILED DESCRIPTION

Embodiments of the present disclosure provide address translation for SR-IOV virtual function apertures. According to these embodiments, address translation is accomplished without the use of conventional address translation windows. In particular, the address translation is accomplished by a simple manipulation of the bits in each address to be translated. In one embodiment, the manipulation is accomplished by simple combinatorial logic. In comparison with conventional techniques, the disclosed address translation techniques are faster, consume less power, and are more scalable.

FIG. 1 shows elements of a computing system 100 according to an embodiment that employs SR-IOV for storage devices. Although in the described embodiments the elements of the computing system 100 are presented in one arrangement, other embodiments may feature other arrangements. For example, elements of the computing system 100 can be implemented in hardware, software, or combinations thereof. While the described embodiments employ 32 virtual functions, other embodiments can employ other numbers of virtual functions, up to the maximum 256 virtual functions allowed by the PCI-SIG Single Root I/O Virtualization and Sharing Specifications.

Referring to FIG. 1, the computing system 100 includes a host 102, a Peripheral Component Interconnect Express (PCIe) device 104, and a storage device 106. The host 102 and the PCIe device 104 can be implemented, for example, in a blade server or the like. The host 102 includes 32 CPU cores 108-0 and 108-1 through 108-31. Each CPU core 108 executes a respective virtual machine (VM) 110-0 and 110-1 through 110-31. Each virtual machine 110 executes a respective virtual function (VF) driver 112-0 and 112-1 through 112-31. One of the CPU cores 108-0 also executes a virtual machine manager (VMM) 114. The virtual machine manager 114 executes a physical function (PF) driver 116. The host 102 also includes a PCIe interface 118 for communication with the PCIe device 104. The PCIe interface 118 is configured as a root complex (RC).

The PCIe device 104 can be implemented as one or more integrated circuits, such as a system-on-chip (SoC) or the like. The PCIe device 104 includes a PCIe interface 120 for communication with the host 102. The PCIe interface 120 is configured as an endpoint (EP). The PCIe interface 120 contains configuration space headers for physical functions and virtual functions. Included in the configuration space headers for physical functions in an SR-IOV Extended Capabilities Header 140. The PCIe device 104 also includes 32 virtual function hardware (VF HW) modules 122-0 and 122-1 through 122-31. Each of the virtual function hardware modules 122 includes hardware to support one of 32 virtual functions. Each of the virtual functions is associated with a respective one of the virtual machines 110 in the host 102. The PCIe device 104 also includes a physical function module 124 for performing one or more physical functions. In the example of FIG. 1, the physical functions include accessing the storage device 106. The physical function module 124 is associated with the virtual machine manager 114 in the host 102.

The PCIe device 104 also includes a physical function address translation module 126, a virtual function address translation module 128, and an address translation configuration module 130. The physical function address translation module 126, and the virtual function address translation module 128, can be implemented in any manner that supports the functions described herein. For example, the physical function address translation module 126, and the virtual function address translation module 128, can be implemented in combinatorial logic or the like. In the present example, the virtual function address translation module 128 includes address translation logic 134.

The physical function address translation module 126, and the virtual function address translation module 128, translate addresses from the address space of the host 102, which is referred to hereinafter as the "PCIe address space," to the address space of the PCIe device 104, which is referred to hereinafter as the "translated address space." The physical function address translation module 126 translates addresses for the physical function module 124. The virtual function address translation module 128 translates addresses for the virtual function hardware modules 122. The address translation configuration module 130 configures the virtual function address translation module 128 at boot time. The address translation configuration module 130 can be implemented, for example, as a processor or the like.

The PCIe device 104 also includes a resource interface for communication with one or more physical resources. In the example of FIG. 1, the PCIe device 104 also includes a storage device interface 132 for communication between the storage device 106, the physical function module 124, and the virtual function hardware modules 122. The storage device interface 132 can be implemented, for example, as a Serial ATA (SATA) interface, a Serial Attached SCSI (SAS) interface, or the like. The storage device 106 can be implemented as multiple hard disk drives, and can include expanders to include large numbers of hard disk drives. For example, the storage device interface 132 can be 8 lanes wide to connect 8 hard disk drives, or to connect 8 expanders for up to 120 hard disk drives, or the like.

Figure 2:
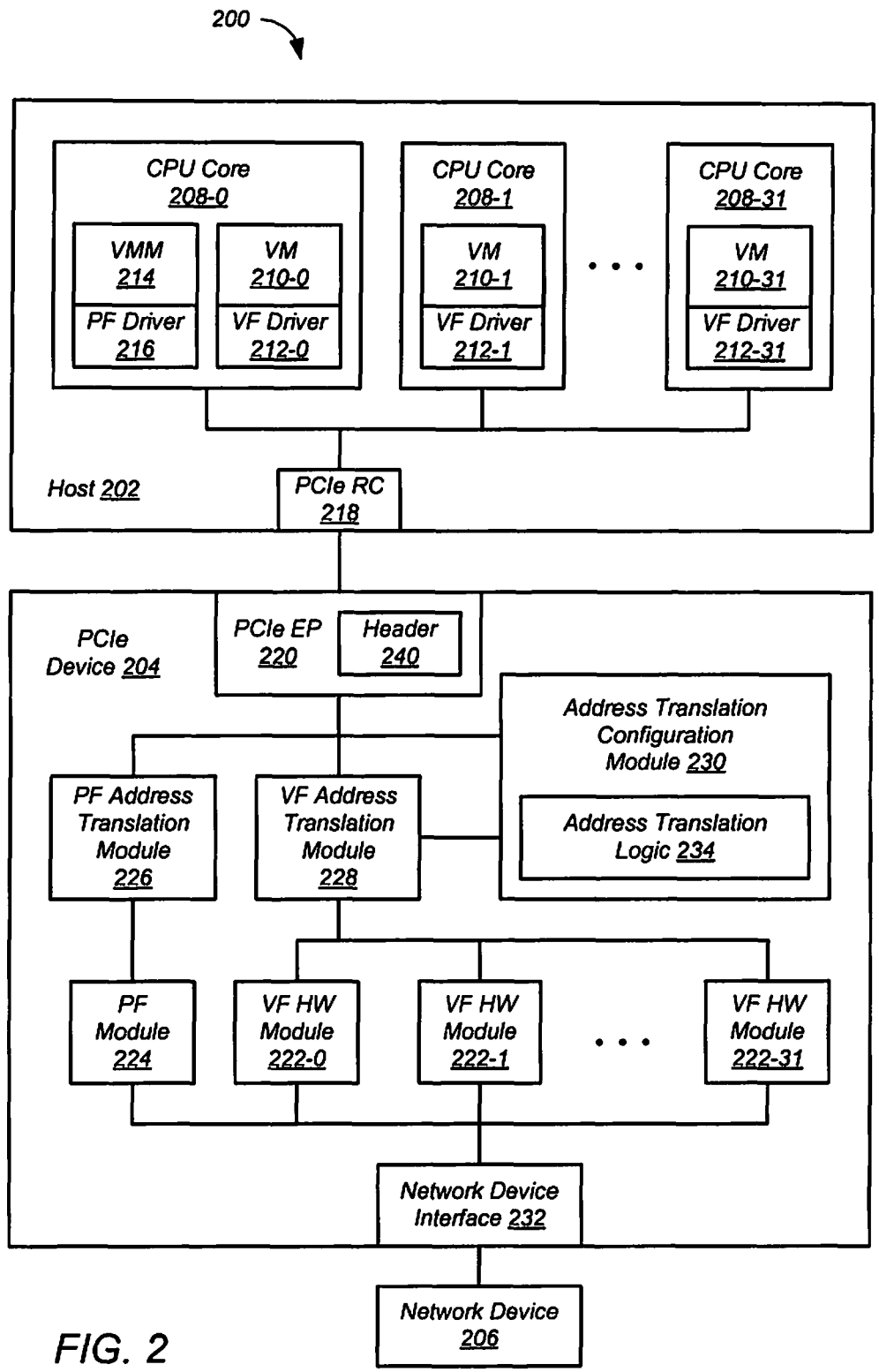
FIG. 2 shows elements of a computing system according to an embodiment that employs SR-IOV for network devices.

FIG. 2 shows elements of a computing system 200 according to an embodiment that employs SR-IOV for network devices. Although in the described embodiments the elements of the computing system 200 are presented in one arrangement, other embodiments may feature other arrangements. For example, elements of the computing system 200 can be implemented in hardware, software, or combinations thereof. While the described embodiments employ 32 virtual functions, other embodiments can employ other numbers of virtual functions, up to the maximum 256 virtual functions allowed by the PCI-SIG Single Root I/O Virtualization and Sharing Specifications.

Referring to FIG. 2, the computing system 200 includes a host 202, a PCIe device 204, and a network device 206. The host 202 and the PCIe device 204 can be implemented, for example, in a blade server or the like. The host 202 includes 32 CPU cores 208-0 and 208-1 through 208-31. Each CPU core 208 executes a respective virtual machine (VM) 210-0 and 210-1 through 210-31. Each virtual machine 210 executes a respective virtual function (VF) driver 212-0 and 212-1 through 212-31. One of the CPU cores also executes a virtual machine manager (VMM) 214. The virtual machine manager 214 executes a physical function (PF) driver 216. The host 202 also includes a PCIe interface 218 for communication with the PCIe device 204. The PCIe interface 218 is configured as a root complex (RC).

The PCIe device 204 can be implemented as one or more integrated circuits, such as a system-on-chip (SoC) or the like. The PCIe device 204 includes a PCIe interface 220 for communication with the host 202. The PCIe interface 220 is configured as an endpoint (EP). The PCIe interface 220 contains configuration space headers for physical functions and virtual functions. Included in the configuration space headers for physical functions in an SR-IOV Extended Capabilities Header 240. The PCIe device 204 also includes 32 virtual function hardware (VF HW) modules 222-0 and 222-1 through 222-31. Each of the virtual function hardware modules 222 includes hardware to support one of 32 virtual functions. Each of the virtual functions is associated with a respective one of the virtual machines 210 in the host 202. The PCIe device 204 also includes a physical function module 224. The physical function module 224 is associated with the virtual machine manager 214 in the host 202.

The PCIe device 204 also includes a physical function address translation module 226, a virtual function address translation module 228, and an address translation configuration module 230. The physical function address translation module 226, and the virtual function address translation module 228, can be implemented in any manner that supports the functions described herein. For example, the physical function address translation module 226, and the virtual function address translation module 228, can be implemented in combinatorial logic or the like. In the present example, the virtual function address translation module 228 includes address translation logic 234. The physical function address translation module 226 translates addresses from the PCIe address space to the Translated address space for the physical function module 224. The virtual function address translation module 228 translates addresses from the PCIe address space to the Translated address space for the virtual function hardware modules 222. The address translation configuration module 230 configures the virtual function address translation module 228 at boot time. The address translation configuration module 230 can be implemented, for example, as a processor or the like.

The PCIe device 204 also includes a network device interface 232 for communication between the network device 206, the physical function module 224, and the virtual function hardware modules 222. The network device interface 232 can be implemented, for example, as a SATA interface, a SAS interface, or the like. The network device 206 can be implemented as multiple network interface controllers such as Ethernet ports and the like, and can include expanders to include large numbers of network interface controllers.

Figure 3:
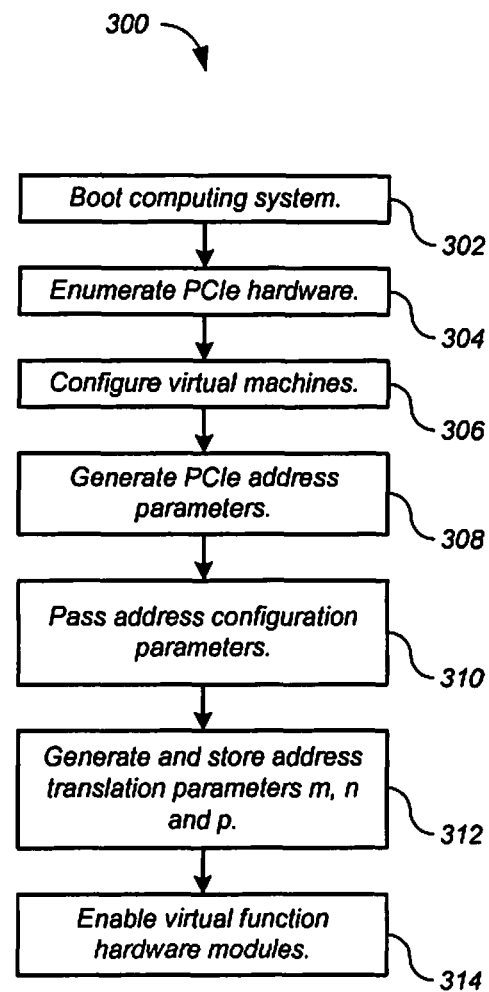
FIG. 3 shows an address translation configuration process according to one embodiment.

FIG. 3 shows an address translation configuration process 300 according to one embodiment. Although in the described embodiments the elements of the address translation configuration process 300 are presented in one arrangement, other embodiments may feature other arrangements. For example, in various embodiments, some or all of the elements of the address translation configuration process 300 can be executed in a different order, concurrently, and the like. Also some elements of the address translation configuration process 300 may not be performed, and may not be executed immediately after each other. In addition, some or all of the elements of the address translation configuration process 300 can be performed automatically, that is, without human intervention. For clarity of description, the address translation configuration process 300 will be described with reference to the computing system 100 of FIG. 1.

Referring to FIG. 3, at 302, the computing system 100 is booted. At 304, the host 102 enumerates the PCIe hardware. In particular, the host 102 finds the PCIe device 104 and determines the number of virtual functions supported by the PCIe device 104 by examining the SR-IOV Extended Configuration Header 140. At 306, the virtual machine manager 114 configures the virtual machines 110. In particular, the virtual machine manager 114 loads the appropriate virtual function drivers 112 into the respective virtual machines 110. At 308, the virtual machine manager 114 generates address configuration parameters. These address configuration parameters represent the locations and sizes of apertures in the PCIe address space for the virtual functions.

At 310 the virtual machine manager 114 in the host 102 passes the address configuration parameters to the SR-IOV Extended Capabilities Header 140 in the PCIe device 104. Then at 312, the address translation configuration module 130 generates and stores the address translation parameters m, n and p. The address translation parameters can be stored, for example, in registers in the virtual function address translation module 128.

Address translation parameter m represents the size of the aperture in the translated address space. In particular, the size of the aperture in the translated address space is $2^m$. The size of the aperture in the translated address space is fixed, and so does not depend upon the address configuration parameters generated by the host 102.

Address translation parameters n and p are generated based upon the address configuration parameters generated by the host 102. Address translation parameter n represents the size of the aperture in the PCIe address space. In particular, the size of the aperture in the PCIe address space is $2^n$. Address translation parameter p represents the number of virtual machines 110 in the host 102, rounded up to the next higher power of 2. In particular, $2^p \geq j > 2^{p-1}$, where j is the actual number of the virtual machines 110 in the host 102. In the computing system 100 of FIG. 1, for example, j=32.

At 314, the address translation configuration module 130 enables the virtual function hardware modules 122. At this point, the address translation configuration process 300 is complete. Therefore, the virtual machines 110 may begin executing, for example by executing applications, operating systems, and the like. When the virtual machines 110 execute functions requiring address translation, the address translation is performed by the virtual function address translation module 128, for example as described below.

Figure 4:
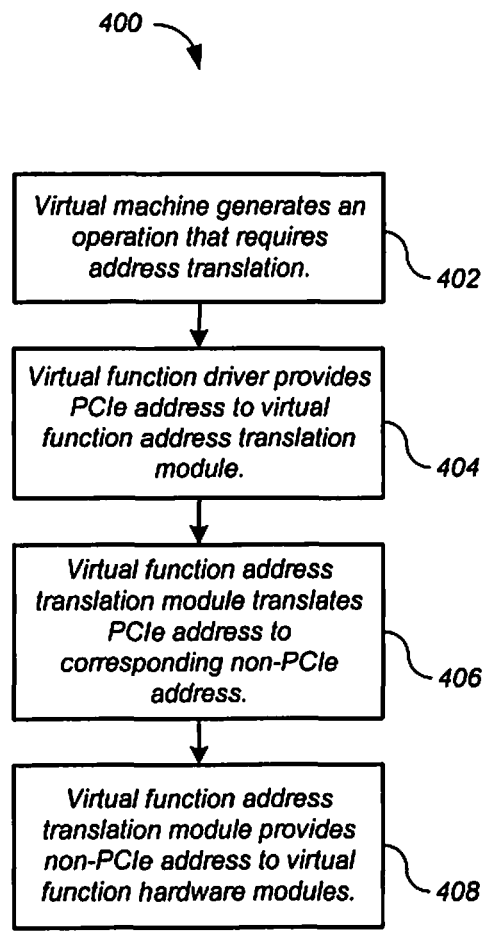
FIG. 4 shows an address translation process according to one embodiment.

FIG. 4 shows an address translation process 400 according to one embodiment. Although in the described embodiments the elements of the address translation process 400 are presented in one arrangement, other embodiments may feature other arrangements. For example, in various embodiments, some or all of the elements of the address translation process 400 can be executed in a different order, concurrently, and the like. Also some elements of the address translation process 400 may not be performed, and may not be executed immediately after each other. In addition, some or all of the elements of the address translation configuration process 400 can be performed automatically, that is, without human intervention. The address translation configuration process 400 can be executed by the virtual function address translation module 128 of FIG. 1, by the virtual function address translation module 228 of FIG. 2, and the like. For clarity of description, the address translation process 400 will be described with reference to the computing system 100 of FIG. 1.

Referring to FIG. 4, at 402, one of the virtual machines 110 in the host 102 generates an operation that requires address translation. For example, in the computing system 100 of FIG. 1, the operation can be an operation involving the storage device 106. The operation includes an address that refers to the PCIe address space of the host 102. For clarity, that address will be referred to as the "PCIe address" hereinafter. The PCIe address must be translated to an address that refers to the translated address space of the PCIe device 104. For clarity, that address will be referred to as the "translated address" hereinafter.

At 404, the respective virtual function driver 112 provides the PCIe address to the virtual function address translation module 128 of the PCIe device 104. In particular, the PCIe address is transmitted by the PCIe interface 118 of the host 102, and is received by the PCIe interface 120 of the PCIe device 104.

At 406, the virtual function address translation module 128 translates the PCIe address to the corresponding translated address. In other words, the virtual function address translation module 128 translates the address from the PCIe address space to the translated address space. In particular, the address translation logic 134 swaps a first sequence of bits in the address with a second sequence of bits in the address. The number of bits in the second sequence is determined according to the number of resources, that is, the number of virtual machines 110 in the host 102, rounded up to the next power of 2. In particular, the number of bits in the second sequence is p. The number of bits in the first sequence is determined according to the difference between the size of the aperture in the PCIe address space and the size of the aperture in the translated address space. In particular, the number of bits in the first sequence is n−m. At 408, the virtual function address translation module 128 provides the translated address to the virtual function hardware modules 122.

Figure 5:
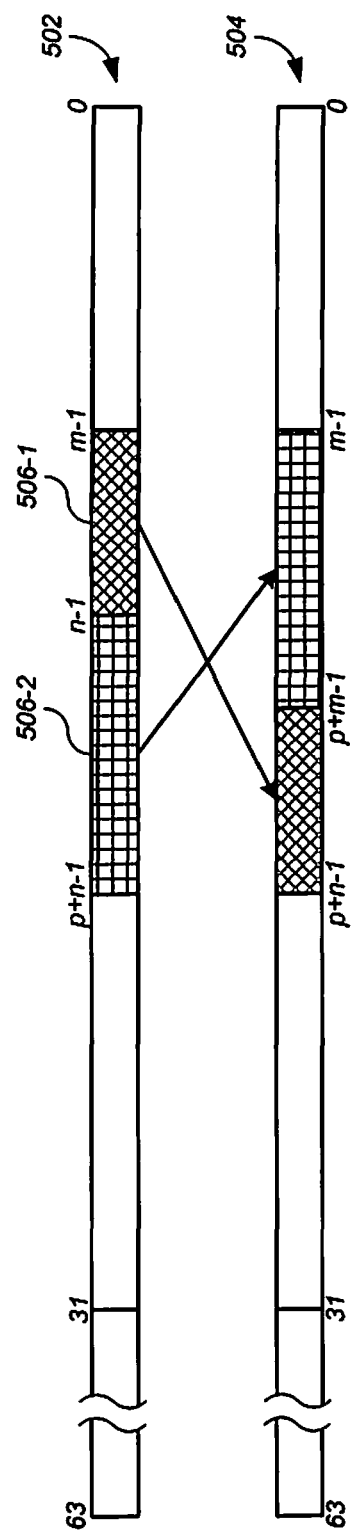
FIG. 5 illustrates the operation of the address translation logic of FIG. 1 according to one embodiment.

FIG. 5 illustrates the operation of the address translation logic 134 of FIG. 1 according to one embodiment. The address before translation, that is, the PCIe address, is shown at 502. The address after translation, that is, the translated address, is shown at 504. Both addresses 502, 504 include k bits. In the example of FIG. 5, k=64. In some implementations, the number of bits in the translated address may be fewer than 64. In the PCIe address 502, bits 0 through n−1 represent the address, bits n through p+n−1 represent the virtual function number, bits p through 31 represent the lower base address for virtual function number 0, and bits 32 through 63 represent the upper base address for virtual function number 0. In some implementations, some of the bits of the lower and upper base addresses may be discarded.

The first sequence of bits 506-1 of the PCIe address 502 consists of bits m through n−1. The second sequence of bits 506-2 of the PCIe address 502 consists of bits n through p+n−1. Note that p is an upper bound to the number of address bits in the second sequence of bits 506-2. As shown in FIG. 5, the address translation logic 134 generates the translated address 504 by swapping the first sequence of bits 506-1 and the second sequence of bits 506-2. As a result of this translation, the first sequence of bits 506-1 occupies bit positions p+m through p+n−1, and the second sequence of bits 506-2 occupies bit positions m through p+m−1, in the translated address 504.

Figure 6:
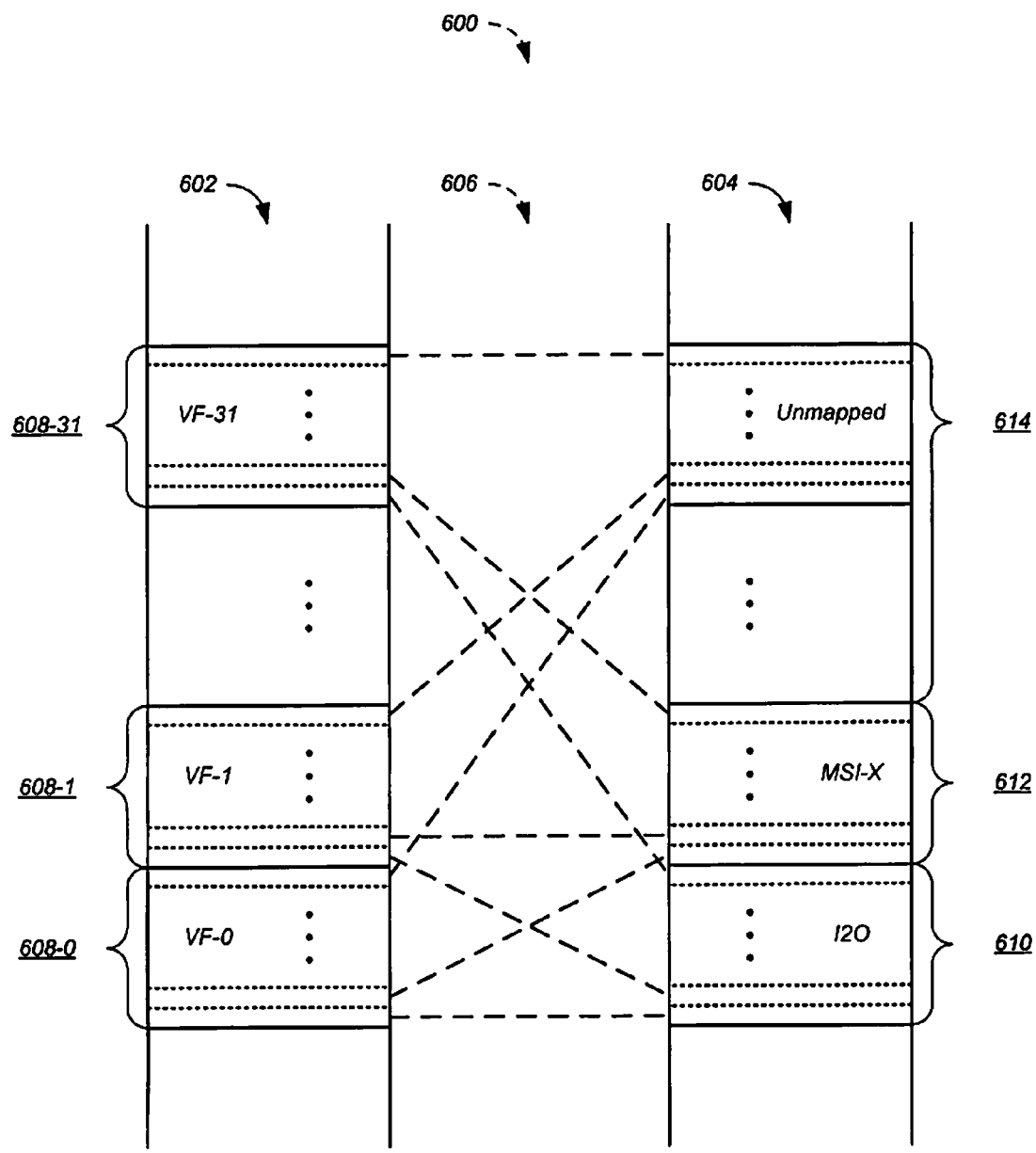
FIG. 6 shows the address space mappings of the address translation process of FIG. 4.

FIG. 6 shows the address space mappings 600 of the address translation process 400 of FIG. 4. The PCIe address space is shown at 602, while the translated address space is shown at 604. The mappings between the PCIe address space 602 and the translated address space 604 are shown as dashed lines at 606. The PCIe address space 602 includes 32 PCIe apertures 608-0 and 608-1 through 608-31, one for each of the 32 virtual functions. Each of the virtual functions is mapped to a corresponding virtual function hardware module 122 (FIG. 1). In the example of FIG. 6, each virtual function hardware module 122 includes a respective 120 module, and a respective MSI-X module. In other embodiments, the virtual function hardware modules 122 can include NVMe modules, PQI modules, and the like. The 120 space in the translated address space 604 is shown at 610. The MSI-X space in the translated address space 604 is shown at 612. The translated address space 604 also includes one or more unmapped regions 614. Unused overhead in each PCIe aperture is mapped to an unmapped region 614. For example, if the size of each PCIe aperture 608 is 4 GB, and only 32 KB of each PCIe aperture 608 is used (for example, 16 KB for each 120 space 610 and 16 KB for each MSI-X space 612), the remainder of the 4 GB of each PCIe aperture 608 is mapped to an unmapped region 614.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. An apparatus comprising:
an interface configured to receive a first address for one of a plurality of resources, wherein the first address refers to a first address space, and wherein each of the resources is associated with
  i) a respective first aperture in the first address space, and
  ii) a respective second aperture in a second address space; and
a virtual function address translation module configured to translate the first address to a second address, wherein the second address refers to the second address space;
wherein the virtual function address translation module includes address translation logic configured to swap a first sequence of bits in the first address with a second sequence of the bits in the first address;
wherein a number of the bits in the second sequence is determined according to a number of the resources; and
wherein a number of the bits in the first sequence is determined according to a difference between a size of the first aperture and a size of the second aperture.

2. The apparatus of claim 1, wherein:
each of the resources comprises a respective virtual function hardware module; and
each of the virtual function hardware modules is associated with a respective virtual machine.

3. The apparatus of claim 2, wherein:
the apparatus can be configured to use j virtual function hardware modules;
an upper bound to the number of bits in the second sequence is p, wherein $2^p \geq j > 2^{p-1}$;
the size of the first aperture is $2^n$;
the size of the second aperture is $2^m$;
the first sequence includes bits m through n−1 of the first address; and
the second sequence includes bits n through n+p−1 of the first address.

4. The apparatus of claim 3, further comprising:
an address translation configuration module;
wherein the interface is further configured to receive a plurality of address configuration parameters; and
wherein the address translation configuration module is configured to determine values for m, n, and p based on the address configuration parameters.

5. The apparatus of claim 2, further comprising:
a resource interface configured to connect the virtual function hardware modules with a physical resource.

6. The apparatus of claim 5, wherein the physical resource comprises at least one of:
a plurality of storage devices; and
a plurality of network interface controllers.

7. The apparatus of claim 2, further comprising:
a physical function hardware module configured to perform a physical function; and
a physical function address translation module configured to translate addresses received by the interface for the physical function.

8. An integrated circuit comprising the apparatus of claim 2.

9. An apparatus comprising:
the integrated circuit of claim 8; and
a host configured to provide the first address to the integrated circuit.

10. The apparatus of claim 9, wherein the host comprises:
a plurality of processors, wherein each processor is configured to execute a respective virtual machine, wherein each virtual machine is associated with a respective one of the virtual function hardware modules, and wherein the interface is a first interface; and
a second interface configured to provide the first address to the integrated circuit.

11. The apparatus of claim 10, wherein one of the processors is further configured to implement a virtual machine manager, wherein the virtual machine manager configures the virtual machines.

12. The apparatus of claim 1, wherein:
the interface comprises a Peripheral Component Interconnect Express (PCIe) interface; and
the first address space is a PCIe address space.

13. A method comprising:
receiving a first address for one of a plurality of resources, wherein the first address refers to a first address space, and wherein each of the resources is associated with i) a respective first aperture in the first address space, and
ii) a respective second aperture in a second address space; and translating the first address to a second address, wherein the second address refers to the second address space, and wherein the translating includes swapping a first sequence of bits in the first address with a second sequence of the bits in the first address;

wherein a number of the bits in the second sequence is determined according to a number of the resources; and wherein a number of the bits in the first sequence is determined according to a difference between a size of the first aperture and a size of the second aperture.

14. The method of claim 13, wherein:
each of the resources comprises a respective virtual function;
a number of the virtual functions is j;
an upper bound to the number of bits in the second sequence is p, wherein $2^p \geq j > 2^{p-1}$;
the size of the first aperture is $2^n$;
the size of the second aperture is $2^m$;
the first sequence includes bits m through n−1 of the first address; and
the second sequence includes bits n through n+p−1 of the first address.

15. The method of claim 14, further comprising:
receiving a plurality of address configuration parameters; and
determining values for m, n, and p based on the address configuration parameters.

16. The method of claim 14, wherein:
the virtual functions represent a physical resource.

17. Computer-readable media embodying instructions executable by a computer to perform functions comprising:
receiving a first address for one of a plurality of resources, wherein the first address refers to a first address space, and wherein each of the resources is associated with
i) a respective first aperture in the first address space, and
ii) a respective second aperture in a second address space; and translating the first address to a second address, wherein the second address refers to the second address space, and wherein the translating includes swapping a first sequence of bits in the first address with a second sequence of the bits in the first address;

wherein a number of the bits in the second sequence is determined according to a number of the resources; and wherein a number of the bits in the first sequence is determined according to a difference between a size of the first aperture and a size of the second aperture.

18. The computer-readable media of claim 17, wherein:
each of the resources comprises a respective virtual function;
a number of the virtual functions is j;
an upper bound to the number of bits in the second sequence is p, wherein $2^p \geq j > 2^{p-1}$;
the size of the first aperture is $2^n$;
the size of the second aperture is $2^m$;
the first sequence includes bits m through n−1 of the first address; and
the second sequence includes bits n through n+p−1 of the first address.

19. The computer-readable media of claim 18, further comprising:
receiving a plurality of address configuration parameters; and
determining values for m, n, and p based on the address configuration parameters.

20. The computer-readable media of claim 18, wherein:
the virtual functions represent a physical resource.

\* \* \* \* \*